June 13, 1933.  L. BENOIT  1,913,655
PACKING OF EGGS
Filed Sept. 13, 1930  2 Sheets-Sheet 1
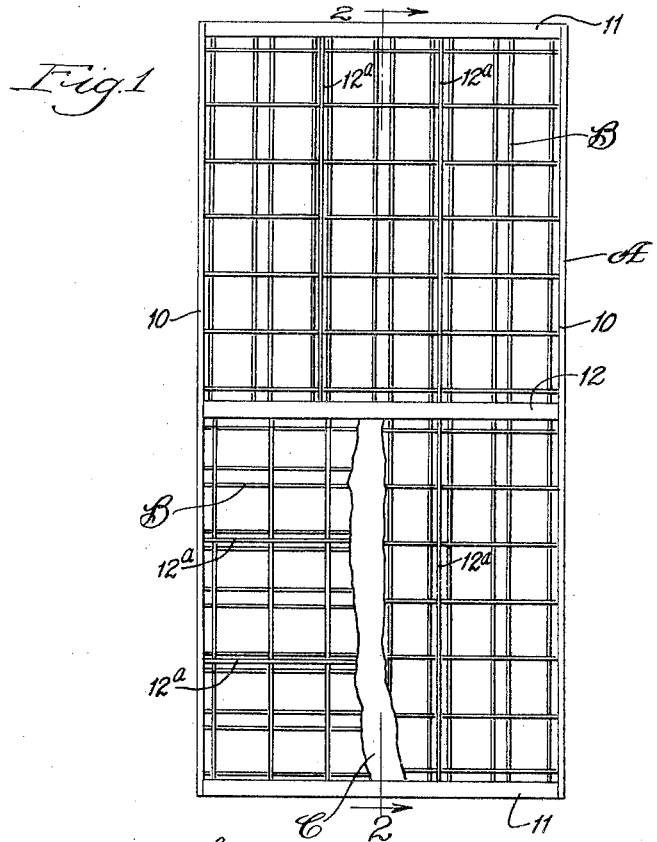
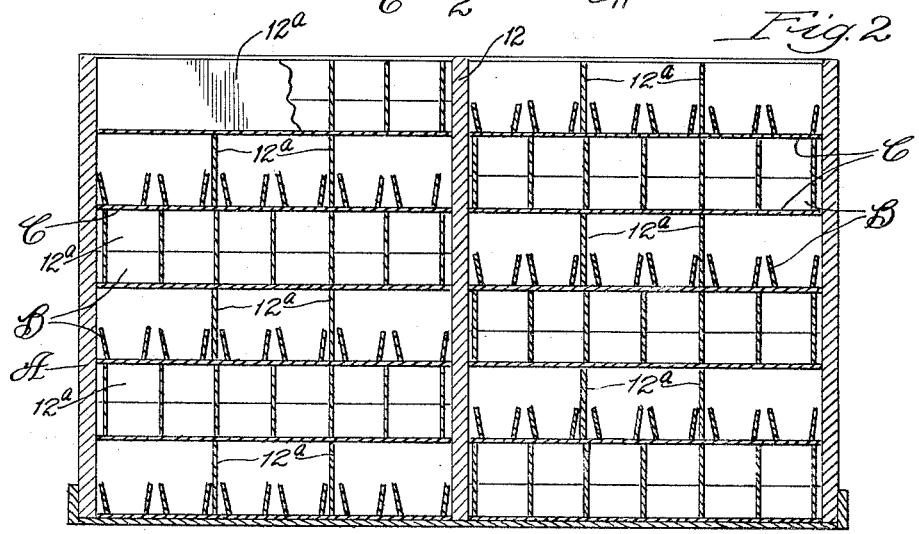

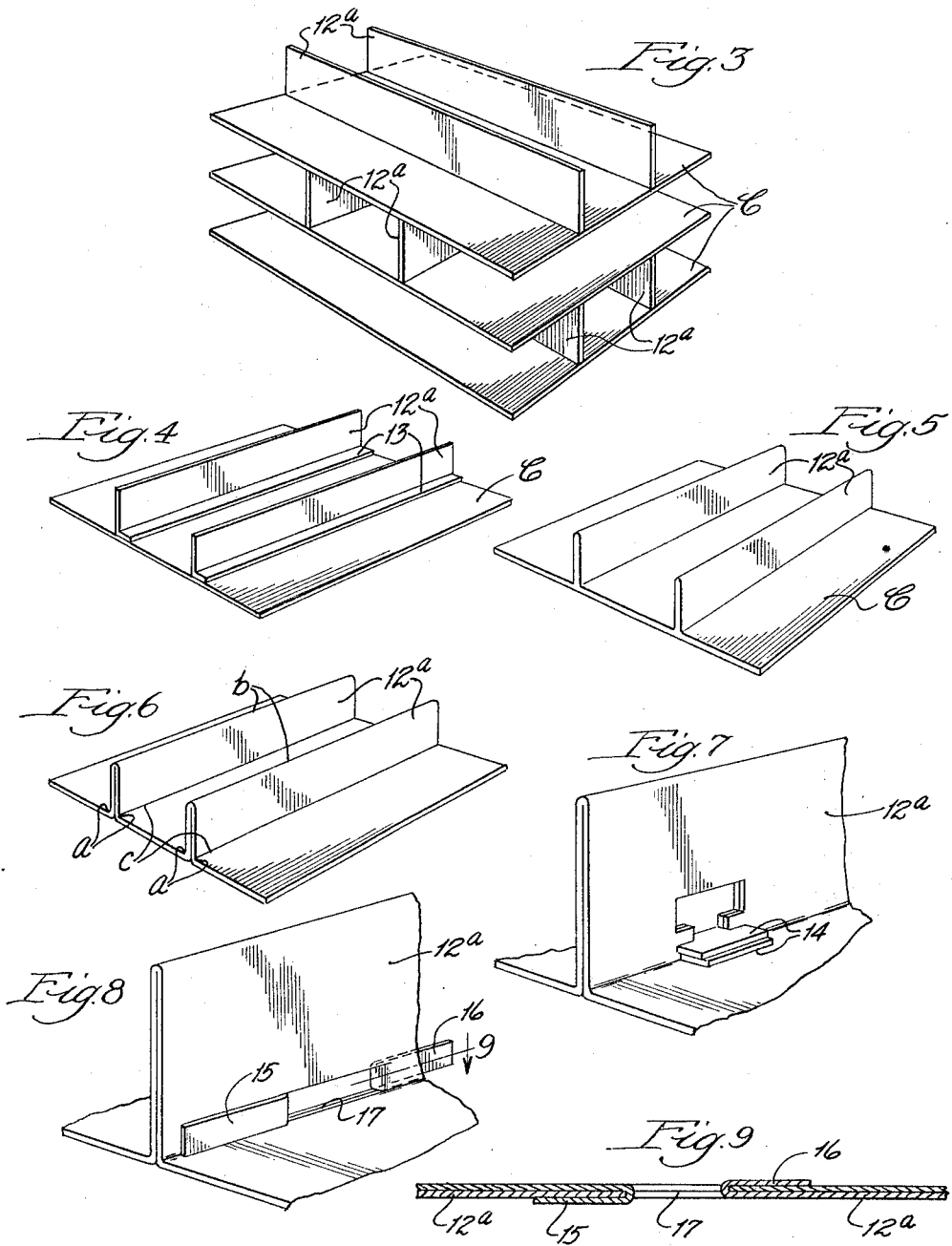

Patented June 13, 1933

1,913,655

UNITED STATES PATENT OFFICE

LEON BENOIT, OF CHICAGO, ILLINOIS

PACKING OF EGGS

Application filed September 13, 1930. Serial No. 481,677.

This invention which has to do generally with the packing of eggs is concerned with a means and method by which eggs received within a filler may be protected when packed in a shipping case, and thereafter be transferred from the case into cartons without any individual handling of the eggs themselves. The description to follow will refer to eggs as a suggestive commodity in this connection, but it should be understood that other like articles, such as fruits, candies, etc., can be handled with equal advantage according to the invention herein disclosed.

It is common practice to grade and sort eggs at the packing plant, and then place them in fillers separated by flats within a packing case which is to be shipped to a distributing point. Later the eggs are removed from the case and arranged in cartons for sale to the consuming trade. In these operations it is necessary that the eggs be handled individually or that the flats and fillers be handled together, inasmuch as the fillers will dump their loads unless the flats serve as temporary bottoms therefor.

According to the present invention, use is made of load-sustaining fillers, such as are shown in Letters Patent No. 1,755,208 granted April 2, 1930. Fillers of this kind require no underlying flats to sustain the eggs which are accommodated within their cells; consequently they may be lifted and moved, complete with contents, as occasion may require. Loaded fillers of this kind may be introduced into a packing case, together with cooperating flats and when placed one on top of another with suitable sustaining walls therebetween will receive adequate protection against movement and resist the transmission of shocks to their contents. When a case containing eggs thus packed is received at the point of destination, each filler, independent of the cooperating flats, may be lifted from the case and placed in a carton or other enclosing wrapper so as to be ready for sale and delivery to a customer. The individual handling of the eggs is thus seen to be entirely dispensed with so as to facilitate and accelerate greatly the packing and unpacking operations.

In the accompanying drawings—

Figure 1 is a view in plan of a conventional egg case showing therein a plurality of fillers arranged in various ways;

Fig. 2 is a vertical section on line 2—2 of Fig. 1;

Fig. 3 which is a view in perspective shows three flats arranged in a tier to provide intervening spaces for loaded fillers;

Figs. 4, 5 and 6 which are perspective views show respectively three suggestive modifications in the construction of the flats;

Fig. 7 is an enlarged fragmentary detail illustrating one form of lock applicable to the flat of Fig. 6;

Fig. 8 shows another form of lock applicable to the same flat; and

Fig. 9 is a detail in section on line 9 of Fig. 8.

Referring to Figure 1, I have there shown a case A having sides 10, ends 11, and a central partition 12 dividing the case into two compartments of equal size. The horizontal dimensions of each compartment are preferably the same, permitting the introduction thereinto of fillers B which may be arranged in rows either lengthwise, as indicated in the upper compartment of Fig. 1, or crosswise, as suggested in the lower compartment of this figure, or both ways as also shown therein. The fillers which are preferably of the conventional 2x6 size are arranged in tiers with intervening flats C as is customary practice. Resting upon or upstanding from each of the flats are two parallel walls 12$^a$ spaced substantially equaldistantly from each other and from the adjacent parallel edges of the flat. The disposition of these walls, i. e., the direction in which they extend relatively to the length or width of the case, may be variously and optionally arranged.

The walls which upstand from each of the flats may be separable therefrom and independent thereof, or be formed integral therewith, or be joined thereto in various ways. For instance, in Fig. 4, each wall is laterally turned at its bottom to provide a base flange 13 which is adhered or connected to the body of the flat in any desired way. As shown, in Fig. 5 the walls which are single are formed integral with the flats. Again, as in Figs. 6, 7, and 8, these walls which are integral with the flat are of double thickness, being formed by bending the flat along the several lines indicated by the letters *a*, *b* and *c*. In this latter construction, it may be desirable to provide some sort of a lock by which to hold the double walls in closely adjacent relation, and for this purpose either of the devices shown in Figs. 7 or 8 will suffice. In the lock of Fig. 7 registering T-shaped tongues 14 are punched from the material forming the walls adjacent their bases, and then both tongues are bent over in the same direction so that one lies upon the other, as shown. When so disposed the T-head of the uppermost tongue will cooperate with the adjacent wall of the flat to hold the other wall with which it is integrally joined against separation. Another form of lock, as shown in Figs. 8 and 9, may consist of a series of tongues 15 and 16 struck from openings 17 to extend in opposite directions from the two walls alternately, the tongues passing through the openings to lie on opposite sides thereof, as indicated in Fig. 9. Some such locking arrangement as this may be conveniently utilized for holding the bases of the two walls in closely adjacent relation.

The fillers containing eggs are ordinarily made of material which is light and relatively weak, consequently a series of such loaded fillers arranged in a tier may lack the requisite strength to adequately protect the contents. This deficiency is supplied, according to my invention, by the provision of the walls which upstand from the flats. By preference all such walls are of somewhat heavier material and endowed with strength sufficient to sustain any vertical load that may be imposed. In this way, the loaded fillers placed alongside of these walls are protected and relieved from excessive load occasioned by the weight of the superposed fillers. The height of these walls may be determined by what is found best in practice, but for ordinary purposes it is contemplated that their upper edges will terminate about even with the corresponding edges of the fillers. In the packing and unpacking operations, the loaded fillers are removed independently of the protecting flats.

As above indicated, the features of this invention may be variously embodied, and protection therefor is accordingly sought within the purview of the claims following.

I claim:

1. Means for packing eggs in a case comprising a series of superposed load-sustaining fillers each comprising a series of angularly disposed longitudinal walls and interconnected transverse partitions adapted to receive and suspend a plurality of eggs, with intervening flats each comprising a horizontal base having associated load-sustaining vertical walls extending between the flats and fillers.

2. Means for packing eggs in a case comprising a series of superposed load-sustaining fillers each comprising a series of angularly disposed longitudinal walls and interconnected transverse partitions adapted to receive and suspend a plurality of eggs, with intervening flats each comprising a horizontal base bent to provide load-sustaining double walls extending between the flats and fillers, there being means of interlock between the double walls whereby to prevent separation thereof.

3. Means for packing eggs in a case comprising superposed load-sustaining fillers each comprising a series of angularly disposed longitudinal walls and interconnected transverse partitions adapted to receive and suspend a plurality of eggs, arranged in series crosswise of each other, with intervening flats each comprising a horizontal base having associated load-sustaining walls extending between the flats and fillers and arranged crosswise of each other in accordance with the disposition of the fillers.

In testimony whereof, I have hereunto set my hand and affixed my seal this 10th day of September, 1930.

LEON BENOIT.